Patented Sept. 16, 1952

2,610,962

UNITED STATES PATENT OFFICE 2,610,962

STYRENE COPOLYMER MIXTURES

William H. Smyers, Westfield, and David W. Young, Roselle, N. J., assignors to The Dow Chemical Company, Midland, Mich., a corporation of Delaware No Drawing. Application December 3, 1946, Serial No. 713,810

6 Claims. (Cl. 260—45.5)

This invention relates to a novel polymerization process and resulting products thereof. More particularly it relates to the preparation of high molecular weight polymers by the mass polymerization or emulsion polymerization technique, in the presence of very high molecular weight cyclic-aliphatic copolymers which have been made by polymerization at temperatures substantially below 0° C. in the presence of a Friedel-Crafts catalyst.

It has heretofore been suggested that certain high molecular weight polymers such as polystyrene, polymethylmethacrylate, etc. which per se are too brittle for many purposes, can be plasticized and improved in flexibility by compounding therewith certain high molecular weight copolymers such as one made by copolymerizing isobutylene and styrene at temperatures below 0° C. in the presence of a Friedel-Crafts catalyst. However, the compounding of two such high molecular weight polymeric materials is attended with substantial difficulty in mixing and often does not obtain a perfectly homogeneous composition.

It has also been suggested that styrene could be polymerized in the presence of a high molecular weight polymer such as polyisobutylene, by first preparing the polybutene at a temperature below 0° C., and then dissolving this polymer in monomeric styrene, together with a small amount of benzoyl peroxide catalyst and heating the mixture. This suggested procedure works satisfactorily for isobutylene polymers of only moderately high molecular weight, such as from about 1,000 to 10,000 or 15,000, but when this process is applied to a higher molecular weight polybutene such as one having a molecular weight of 50,000 or 100,000, the finished composition after polymerization of the styrene, shows a cloudiness and other undesirable characteristics due to the incompatability of the high molecular weight polybutene with the high molecular weight polystyrene. Also, this composition cannot be sheeted into thin films.

Now, according to the present invention, it has been found that a number of unexpected advantages are obtained if styrene is polymerized in the presence of a high molecular weight copolymer of styrene and isobutylene having an intrinsic viscosity of at least 0.5 and a combined styrene content of about 50% to 80%, preferably about 60% to 70% by weight.

Although styrene-isobutylene copolymers having a lower intrinsic viscosity, such as from 0.1 to 0.4, are sufficiently low in molecular weight to be compatible with the finished polystyrene, even when a wide range of styrene and isobutylene proportions are used in making the copolymer, nevertheless such low molecular weight and low intrinsic viscosity copolymers of styrene and isobutylene are not satisfactory for the purposes of the present invention, because they are either soft and sticky or soft and brittle, and are so low in tensile strength that they greatly impair the properties of the polystyrene produced in their presence, without imparting the desired plasticity and toughness in the finished composition.

It is also noted that styrene-isobutylene copolymers even having an intrinsic viscosity of at least 0.5, but having a combined styrene content considerably below 50% by weight, such as 10% to 40% by weight, are not sufficiently compatible with high molecular weight polystyrene produced in its presence to permit satisfactory use according to the process of the present invention. On the other hand, a high molecular weight copolymer of styrene and isobutylene having an intrinsic viscosity as high as 0.5 but having a combined styrene content much higher than 80%, such as in the range of 85% to 95%, is compatible with polystyrene produced in its presence, but is too brittle to make any substantial reduction in the inherent brittleness of the polystyrene itself.

According to the present invention, in place of the styrene-isobutylene copolymers mentioned above, one may also use other cyclic-aliphatic copolymers having a similarly high intrinsic viscosity of at least 0.5, preferably 0.7, and having a content of combined cyclic constituent sufficiently high that the copolymer will be compatible with polystyrene or other heat-polymerized polymers produced in its presence, and yet below the amount of combined cyclic constituent which imparts brittleness to the copolymer and prevents it from plasticizing and flexibilizing the polymers made in their presence. For instance, instead of styrene in such copolymers, one may use alphamethyl styrene, paramethyl styrene, alphamethyl paramethyl styrene, 2-4-dichlorostyrene, parachlorostyrene, alpha-methoxy styrene, 2-chlorparamethyl styrene, and other polymerizable mono-olefinic aromatic compounds, such as vinyl naphthalene, dihydronaphthalene, indene, etc. In place of isobutylene in the copolymer one may use other lower aliphatic olefins having from 2 to 8 carbon atoms, preferably, 3 to 5 carbon atoms such as methyl-2, butene-1, propylene, iso-octene, and even ethylene under certain circumstances, as will be noted later.

Although, it is preferred for most purposes that the above described cyclic-aliphatic linear type copolymer be substantially saturated as will naturally result from the use of the two types of reactants described above, it may be desirable under some circumstances to make a product having a slight unsaturation, such as having an iodine number less than 10 and preferably about 0.1 to 1. Such a result may be obtained by using a third copolymerization reactant namely a small amount of a diolefin or other polymerizable polyene, as for instance about 0.5% to 3% of isoprene, or about 1% to 10% or so of butadiene. Other polyenes which may be used include divinylbenzene, 2-methylpentadiene, cyclopentadiene, myrcene, allo-ocimene, 2-3-di methyl butadiene 1-3, etc. When three reactants are used as thus suggested, the resulting copolymer may be referred to as a tripolymer.

In carrying out the copolymerization of the styrene and isobutylene, or other reactants mentioned above, in order to make a high molecular weight linear type copolymer having an intrinsic viscosity of at least 0.5, it is preferred to use a fairly strong Friedel-Crafts catalyst at a temperature below −50° C. and preferably below −80° C., and this should preferably be done in the presence of a lower alkyl halide of less than 4 carbon atoms, such as methylchloride or ethylchloride, as solvent for the copolymerization reactants and resulting copolymer. Refrigeration may be effected by known methods such as by internal or external cooling coils or jacket, or by internal refrigeration by the evaporization of a very low boiling liquefied gaseous material such as propane, ethane, ethylene, or even methane, and the like, using the latent heat of evaporation of the refrigerant to absorb the heat of polymerization, as well as to cool the initial reactants down to the desired copolymerization temperature before actually starting the copolymerization.

The catalyst is prepared by dissolving aluminum chloride, titanium tetrachloride or boron fluoride or other suitable Friedel-Crafts catalyst or complex in a lower alkyl halide solvent such as ethyl chloride at room temperature or slightly above, or in methyl chloride at its boiling point which is about −23° C., and then cooling the resultant catalyst-solvent solution down to the desired copolymerization temperature.

The copolymerization reaction is fast and vigorous, and as soon as it is completed, residual catalyst is inactivated by addition of a small amount of lower alcohol such as isopropyl alcohol or ethyl alcohol, or other suitable hydrolyzing agents such as aqueous caustic soda or water, etc. In some cases, the desired high molecular weight copolymer is thrown out of solution during the step of hydrolyzing residual catalysts, and in such case may be separated from the liquid layers and in some cases the copolymer remains in solution in the lower alkyl halide solvent while the hydrolyzed catalyst forms an aqueous or alcoholic sludge layer which may be separated, and then the copolymer may be recovered from the solvent solution either by evaporation or by precipitation with a larger amount of alcohol or acetone and the like. It is preferable to wash the high molecular weight copolymer one or more times with water, alcohol, dilute aqueous caustic soda solution or other suitable media and then to dry it, preferably by heating and milling in order to completely remove moisture therefrom.

According to the present invention, the high molecular weight copolymer thus prepared, having a Staudinger molecular weight of at least about 20,000 and an intrinsic viscosity (in toluene) of at least 0.5, is now dissolved in a concentration of about 5% to 50%, preferably about 10% to 30%, by weight in styrene or other suitable heat-polymerizable monomer, together with a small amount of polymerization catalyst such as benzoyl peroxide, etc., and then the resultant solution is heated either directly as such according to the so-called mass polymerization technique, or by first emulsifying this copolymer-monomer solution with water or other aqueous medium by means of a suitable emulsifying agent such as soaps, e. g. sodium stearate, etc., and then finally heating the resulting emulsion. When operating according to this latter emulsion technique, the amount of water or other aqueous medium or even some organic medium insoluble in the polymerizable monomer should be about 20 to 200% by weight based on the polymerizable monomer used, and the emulsifying agent should generally be used in the concentration of about 0.5 to 5% by weight based on the amount of water used.

The temperature at which such heat polymerization should normally be carried out will range from about room temperature, or about 20° C., up to about 125° C., and preferably from about 30 to 80° C. The time required for this heat polymerization, varies inversely according to the temperature used, ranging from about 2 to 12 hours at 80° C., to about 6 to 120 hours at 40° C., up to about 180 to 1000 hours at 20° C., and the temperature-time conditions required vary somewhat with different heat-polymerizable monomers.

Although it is not certain, it is believed that in addition to obtaining a truly homogeneous composition of styrene-isobutylene copolymer and polystyrene, some of the styrene monomer actually heat-polymerizes onto the styrene-isobutylene copolymer molecules present, to form a new type of composite molecule, e. g. a di-polymeric molecule or generically a poly-polymeric molecule, as it may contain even three or more polymers built up together one after the other.

Instead of using styrene as the polymerizable monomer, other materials may be used such as paramethyl styrene, parachlor styrene, 2-chlor-paramethyl styrene, 2-4-dichlor styrene, 2-5-dichlor styrene, etc., parabrom styrene, 3-methoxy styrene, 4-methoxy styrene, 4-phenoxy styrene, or other heat-polymerizable substituted styrenes or corresponding other hydrocarbons such as indene, vinylnaphthalene, dihydronaphthalene etc.

Instead of using the above mentioned aromatic types of heat-polymerizable monomers, the invention is applicable to other types of heat polymerizable monomers such as vinylchloride, vinylacetate, vinylidene chloride, methylmethacrylate, lauryl methacrylate or various other unsaturated esters such as fumarates etc., or mixtures thereof. In the case of these various polymerizable unsaturated aliphatic compounds, the high molecular weight cyclic-aliphatic copolymer to be dissolved in the heat polymerizable monomer, preferably should have a lower content of combined cyclic constituent than discussed above for use in the presence of heat-polymerizable styrene or other aromatic materials. For instance, when heat polymerizing methylmethacrylate, laurylmethacrylate or a mixture of vinyl chloride and vinyl acetate, one may use a styrene-isobutylene copolymer or a chlorstyrene-isobutylene copolymer containing about 10 to 60%, preferably about 20 to 50% by weight of combined cyclic constituent.

Having thus described the general principles of the invention some experimental data are given for the sake of illustration and to show some of the unexpected advantages of the invention.

Example I

A styrene-isobutylene copolymer was prepared at −103° C. to produce a copolymer having an intrinsic viscosity (in toluene), of 0.84, and having about 60% by weight of combined styrene. Then 10% by weight of this copolymer was dissolved in pure monomeric styrene. 2000 ml. of the resulting solution was treated with 0.2% of benzoyl peroxide at room temperature and the solution heated under reflux at 40° C. for 8 hours, at the end of which time the materials were heated to approximately 150° C. for about 10 minutes to soften it sufficiently so that it would flow out of the reactor onto a piece of holland cloth to cool. This polystyrene which was made in situ in the presence of 10% by weight of styrene-isobutylene copolymer was examined and found to have good clarity and was tested for various physical properties in comparison with a plain polystyrene made under the same polymerization conditions except in the absence of the styrene-isobutylene copolymer, and also in comparison with a mill-mixed blend of 10% of the copolymer and 90% of polystyrene.

Although it is difficult to make a styrene-ethylene copolymer of high molecular weight and intrinsic viscosity, by the low temperature Friedel-Crafts technique, such copolymers may be made at 100° to 400° C. under a high pressure of 200 to 2,000 atmospheres with a peroxide or oxygen catalyst. These copolymers may be used alone or preferably together with a low temperature Friedel-Crafts copolymer, e. g. styrene-isobutylene copolymer for dissolving in styrene and heat-polymerizing.

can be effected with such a relatively slight loss in some of the strength characteristics. For instance, whereas the plain polystyrene had a flexure strength of 3,800 lbs./sq. in. the modified polystyrene had a flexure strength of 3,000 lbs./sq. in., which is unexpectedly high considering that when 10% by weight of a similar styrene-isobutylene copolymer was mixed on a hot mill with 90% by weight of an 80,000 molecular weight polystyrene, substantially the same as made in the above experiment, the resulting mixture, even after 15 minutes mixing on the hot mill, had a flexure strength of only 2,100 lbs./sq. in. This is believed due to inability to obtain a completely homogeneous mixture by the hot milling method. Also, the clarity as obtained in 5, 15, 20, and 30 minute milling tests with 10% by weight of a similar styrene-isobutylene copolymer in an 80,000 molecular weight polystyrene, proved that the degree of clarity of a ¼ inch pressed sheet was better for the samples that were made by dissolving the styrene-isobutylene copolymer in the styrene and then heat polymerizing the monomer rather than making both polymers first and then mixing them on the hot mill. Here again it is believed that the lesser clarity obtained with the mill mixing is due to lack of a completely homogeneous composition, whereas the polymerization of the styrene in the presence of the styrene-isobutylene copolymer gives a completely homogeneous composition.

Improvement was noted in machinability, extrusion flow properties, and resistance to moisture vapor penetration with additions of up to 20% of this copolymer in polystyrene. 10% of the copolymer reduces the M. V. P. (moisture vapor permeability) of polystyrene by 30% (by the General Foods method).

Example II

Another set of tests was made similar to those in Example I except that in this case 30% by weight of the styrene-isobutylene copolymer, was dissolved in the styrene monomer, and after addition of the benzoyl peroxide catalyst the re-

TABLE 1

| | | | Present Invention |
|---|---|---|---|
| Percent Polystyrene | 100 | 90 | 90 |
| Percent Copolymer (60% styrene) | | 10 | 10 |
| Property, How made | | mill-mixed | In situ |
| Heat softening point (°C.) (modified Williams plasticity) | 105 | 92 | 95 |
| Distortion temp. (°C.) | 80 | 76 | 75 |
| Brinell hardness | 20 | 18 | 18 |
| Rockwell hardness (M Number) | 75 | 68 | 70 |
| Compression strength (lbs./sq. in.) | 15,000 | 13,500 | 13,000 |
| Tensile | 5,000 | 3,000 | 3,800 |
| Impact Strength ft. lbs./in. of notch, Charpy; Simpl beam; Simpl | 3,100 | 4,000 | 5,000 |
| Flexure Strength lbs./sq. in | 3,800 | 2,100 | 3,000 |
| Clarity | Clear | Cloudy | Very slightly cloudy |
| Crescent tear (lbs./linear inch) | 24 | 120 | 18 |

The above data show that polymerization of the styrene in situ in the presence of the high molecular weight styrene-isobutylene copolymer effected a very substantial modification of the inherent brittleness and refractoriness of the plain polystyrene. The reduced brittleness is particularly shown by a reduction in the Brinell hardness from 20 to 18 and by the superior impact strength and tear resistance. It is also remarkable that the desired amelioration of some of the undesirable characteristics of plain polystyrene sulting mixture was heated for 12 hours. The slightly longer time of polymerization was required on account of the diluting effect of the larger amount of styrene-isobutylene copolymer used in this example as compared to Example I. The resulting 30% copolymer-modified polystyrene, and a corresponding sample of plain polystyrene made under the same conditions except in the absence of any styrene-isobutylene copolymer, were subjected to various physical tests with the following results.

TABLE 2

|  | | Present Invention |
|---|---|---|
| Percent Polystyrene | 100 | 70 |
| Percent Copolymer (60% styrene) | | 30 |
| Distortion temp. (°C.) (by modified Williams method) | 105 | 85 |
| Impact Strength (ft. lbs./in. of Notch (C)) | 3,000 | 5,000 |
| Brinell hardness | 20 | 12 |
| Compression Strength (lbs./sq. in.) | 15,000 | 8,000 |
| Rockwell hardness (M Number) | 75 | 45 |
| Clarity | Clear | Cloudy |

The above data indicate, particularly in the Brinell hardness, that the modified polystyrene made in the presence of the 30% of the styrene-isobutylene copolymer, was much softer and more workable than the plain polystyrene made under the same polymerization conditions except in the absence of the styrene-isobutylene copolymer. For instance, the reduction of the Brinell hardness from 20 to 12 shows the tremendous plasticizing effect of the styrene-isobutylene copolymer.

Here again, in Example II, as was the case in Example I, the modified polystyrene, i. e. made in the presence of the styrene-isobutylene copolymer, showed a much higher degree of clarity when pressed into a slab ¼ inch thick, than did a mixture of 70% of plain polystyrene of 80,000 molecular weight and 30% of the same styrene-isobutylene copolymer when mixed on a hot mill. Samples made with various milling times of 5, 15, and 30 minutes, all showed poorer clarity than the sample made by polymerizing the styrene directly in the presence of the styrene-isobutylene copolymer. As noted above, the composition made according to the present invention by polymerizing the styrene in situ in the presence of the styrene-isobutylene copolymer, is a completely homogeneous mixture, whereas the hot mill mixing of two high molecular polymers apparently does not obtain an absolutely homogeneous mixture.

*Example III*

A styrene-isobutylene copolymer having about 50% by weight of combined styrene and having an intrinsic viscosity of 0.95, was dissolved in a concentration of about 5% by weight, in styrene containing peroxide catalyst, and the solution was heated to 60° C. for 25 hours. The resulting composition indicated that the copolymer with 50% styrene was less compatible in the polystyrene than the copolymers that contained 60% styrene by analysis.

Copolymers having lower proportions of combined styrene, e. g. 40%, 20%, etc., and having an intrinsic viscosity of at least 0.5, are not compatible with high molecular weight polystyrene made either in situ or mill-mixed.

*Example IV*

A styrene-isobutylene copolymer having a combined styrene content of about 80% by weight and having an intrinsic viscosity of 0.63 was made at a copolymerization temperature of −100° C. using a catalyst consisting of 0.5% of $AlCl_3$ in methyl chloride, and using 3 volumes of methyl chloride as solvent per volume of copolymerization reactants. The resulting copolymer is per se a hard resin, almost more resembling a polystyrene than it does a styrene-isobutylene copolymer having a combined styrene content of about 60%, as used in Example I. 20% by weight of this styrene-isobutylene copolymer of 80% styrene content and 0.63 intrinsic viscosity was dissolved in pure styrene monomer and, after the addition of 0.2% of benzoyl peroxide, the mixture was heated at 40° C. for 10 hours, at the end of which time it was heated to 150° C. to soften it, and poured out onto holland cloth to cool. This modified polystyrene was then subjected to various physical tests in comparison with some plain polystyrene which had been polymerized under the same conditions except without the addition of any styrene-isobutylene copolymer. The results of these physical tests were as follows:

TABLE 3

|  | | Present Invention |
|---|---|---|
| Percent Polystyrene | 100 | 80 |
| Percent Copolymer (80% styrene) | | 20 |
| Heat softening Point (°C.) | 112 | 100 |
| Brinell hardness | 21 | 19 |
| Rockwell hardness | 75 | 70 |

The above data indicate that although the styrene-isobutylene copolymer with 80% combined styrene does have some plasticizing effect on the polystyrene, as indicated by a reduction of the Brinell hardness from 21 to 19, and the Rockwell hardness from 75 to 70, it required 20% of this particular copolymer to effect this plasticizing, whereas in Example I only 10% styrene-isobutylene copolymer, having a combined styrene content of 60%, effected a substantially equivalent amount of plasticizing, and therefore was practically twice as effective in plasticizing characteristics as the styrene-isobutylene copolymer of 80% combined styrene.

The composition prepared according to the present invention as described in Example I namely made by heat-polymerizing styrene in situ in the presence of 10% by weight of high molecular weight styrene-isobutylene copolymer having 60% combined styrene and 40% isobutylene, which overall composition therefore contains about 4% by weight of isobutylene, is much more plastic and workable than a plain styrene-isobutylene copolymer made with 96% styrene and 4% isobutylene. Similarly the composition made by polymerizing styrene in the presence of 30% by weight of styrene-isobutylene copolymer of 60% combined styrene, which composition therefore has about 12% of isobutylene on the basis of the overall composition, is surprisingly superior in plastic and workable characteristics to a styrene-isobutylene copolymer made with 88% of styrene and 12% of isobutylene.

*Example V*

20% by weight of styrene-isobutylene copolymer as used in Example I was dissolved in vinyl chloride and the latter was polymerized. The mixture was more plastic at room temperature than polyvinyl chloride plasticized with diphenyl, and had superior electrical properties and resistance to moisture vapor penetration.

As another feature of the invention it is contemplated that instead of using a single styrene-isobutylene copolymer, one may use a mixture of several different copolymers having physical properties or other characteristics which supplement each other. For instance, one may advantageously dissolve 10% by weight of a styrene-isobutylene copolymer having 80% combined styrene and an intrinsic viscosity of 0.63 (as used in Example 4) along with 10% by weight of a styrene-isobutylene copolymer having a 40% combined styrene and an intrinsic viscosity of 0.8 or so, in 80% by weight of styrene monomer and then heat-polymerizing the mixture. One may also heat-polymerize styrene, etc. in the presence of two cyclic-aliphatic copolymers of which one is a high molecular weight tough copolymer having an intrinsic viscosity of at least 0.5 and a combined styrene content of 50 to 80% or so, and the other is a low molecular weight hard brittle copolymer having an intrinsic viscosity of about 0.1 to 0.4 and a similar combined styrene content of about 50 to 80%, preferably about 55 to 70%, by weight, e. g. a styrene-isobutylene copolymer of 60% combined styrene, made at −23° C. and having an intrinsic viscosity of 0.2.

Also, after the heat-polymerizable monomer has been heat-polymerized in the presence of the high molecular weight cyclic-aliphatic copolymer, the resulting composition may, if desired, with addition of fragments, other resins, wood flour, wax, clay, etc., be worked on a rubber mill etc., to form sheets, etc.

It is not intended that this invention be limited to the specific examples which have been given merely for the sake of illustration, but only by the appended claims, in which it is intended to claim all novelty inherent in the invention as well as all modifications coming within the scope and spirit of the invention.

We claim:

1. Process which comprises dissolving in 70 to 95 parts by weight of styrene, 5 to 30 parts by weight of high molecular weight styrene-isobutylene copolymer having 60 to 70% combined styrene and an intrinsic viscosity of 0.6 to 0.95, adding a polymerization-promoting amount of benzoyl peroxide, and polymerizing said monomeric styrene in situ at 20 to 125° C.

2. Process which consists in dissolving in 90 parts by weight styrene, 10 parts by weight of high molecular weight styrene-isobutylene copolymer having 60% combined styrene and an intrinsic viscosity of about 0.84, adding about 0.2% of benzoyl peroxide, and heat-polymerizing said monomeric styrene in situ at 40° C. for 8 hours.

3. Process which comprises dissolving in 70 to 95 parts by weight of styrene, 5 to 30 parts by weight of a high molecular weight styrene-isobutylene copolymer having 50 to 80% by weight of combined styrene and an intrinsic viscosity above 0.5, and polymerizing said monomeric styrene at about 20° C. to 125° C.

4. Product comprising a homogeneous mixture made by dissolving a high molecular weight solid copolymer of 50 to 80% by weight of a polymerizable mono-olefinic aromatic compound selected from the group consisting of hydrocarbons and chlorostyrenes, and 50 to 20% by weight of an olefin of 2 to 8 carbon atoms, having an intrinsic viscosity above 0.5, in a monomeric polymerizable mono-olefinic aromatic compound selected from the group consisting of hydrocarbons and chlorostyrenes and polymerizing said monomeric compound to a high molecular weight in situ in the presence of the first-mentioned high molecular weight copolymer.

5. A homogeneous composition made by dissolving about 5 to 50% by weight of a high molecular weight copolymer of styrene and isobutylene having about 60 to 70% by weight of combined styrene and having an intrinsic viscosity above 0.7, in about 95 to 50% by weight of monomeric styrene and heat-polymerizing said styrene in situ in the presence of said styrene-isobutylene copolymer.

6. Process which comprises dissolving in 70 to 95 parts by weight of a heat-polymerizable mono-olefinic aromatic compound selected from the group consisting of hydrocarbons and chlorostyrene, about 5 to 30 parts by weight of a high molecular weight solid copolymer of 50 to 80% by weight of a polymerizable mono-olefinic aromatic compound selected from the group consisting of hydrocarbons and chlorostyrenes, and 50 to 20% by weight of unsaturated lower aliphatic hydrocarbon selected from the group consisting of mono-olefins and mixtures thereof with small amounts of polyenes, said copolymer having an intrinsic viscosity above 0.5, and heating the resultant solution to effect polymerization of said polymerizable monomer.

WILLIAM H. SMYERS.
DAVID W. YOUNG.

REFERENCES CITED

The following references are of record in the file of this patent:

UNITED STATES PATENTS

| Number | Name | Date |
|---|---|---|
| 2,213,423 | Wiezeivch | Sept. 3, 1940 |
| 2,274,749 | Smyers | Mar. 3, 1942 |
| 2,282,002 | Scott | May 5, 1942 |
| 2,320,924 | Gift | June 1, 1943 |
| 2,491,525 | Sparks | Dec. 20, 1949 |

FOREIGN PATENTS

| Number | Country | Date |
|---|---|---|
| 610,422 | Great Britain | Oct. 15, 1948 |

OTHER REFERENCES

Boyer: Rubber Chem. and Tech., 17, 808, 809 (1944).